United States Patent
Schmid et al.

(10) Patent No.: US 9,264,138 B2
(45) Date of Patent: Feb. 16, 2016

(54) RELIABLE VISIBILE LIGHT COMMUNICATION WITH DARK LIGHT SYNCHRONIZATION

(71) Applicant: Disney Enterprises, Inc., Burbank, CA (US)

(72) Inventors: Stefan Matthias Schmid, Olten (CH); Giorgio Corbellini, Zurich (CH); Thomas R. Gross, Zurich (CH); Stefan Mangold, Liebefeld (CH)

(73) Assignees: Disney Enterprises, Inc., Burbank, CA (US); ETH Zurich (Eidgenoessische Technische Hochschule Zurich), Zurich (CH)

(*) Notice: Subject to any disclaimer, the term of this patent is extended or adjusted under 35 U.S.C. 154(b) by 118 days.

(21) Appl. No.: 13/895,400

(22) Filed: May 16, 2013

(65) Prior Publication Data
US 2014/0341589 A1    Nov. 20, 2014

(51) Int. Cl.
*H04B 10/00* (2013.01)
*H04B 10/116* (2013.01)
*H04L 7/04* (2006.01)

(52) U.S. Cl.
CPC ............... *H04B 10/116* (2013.01); *H04L 7/04* (2013.01); *H04L 2007/045* (2013.01)

(58) Field of Classification Search
CPC ...... H04B 10/116; H04L 7/0075; H04L 7/04; H04L 2007/045
USPC ........................................................ 398/131
See application file for complete search history.

(56) References Cited

U.S. PATENT DOCUMENTS

| | | |
|---|---|---|
| 5,822,373 A | 10/1998 | Addy |
| 5,995,253 A | 11/1999 | Flaherty |
| 6,548,967 B1 | 4/2003 | Dowling et al. |
| 7,072,587 B2 | 7/2006 | Dietz et al. |
| 7,689,130 B2 | 3/2010 | Ashdown |
| 8,107,825 B2 | 1/2012 | Rajagopal et al. |
| 8,165,472 B2 | 4/2012 | Takene et al. |
| 8,253,353 B2 | 8/2012 | Baggen et al. |
| 8,401,394 B2 | 3/2013 | Walewski |
| 8,447,189 B2 | 5/2013 | Kim et al. |

(Continued)

OTHER PUBLICATIONS

Corbellini, Giorgio et al., Demo: LED-to-LED Visible Light Communication for Mobile Applications, The 39th International Conference and Exhibition on Computer Graphics and Interactive Techniques, Aug. 2012, 1 page, ACM, New York, United States.

(Continued)

*Primary Examiner* — Danny Leung
(74) *Attorney, Agent, or Firm* — Patterson & Sheridan, LLP (57) ABSTRACT

LEDs that transmit or receive data in a VLC channel may create a flickering effect which is caused by the human eye being able to perceive the fluctuations of the light intensity in a LED. To prevent flickering such that the LED is perceived as being illuminated at a constant intensity, the LEDs may emit light based on a pattern of dark and energy slots. During the dark slots, the LEDs may be reversed bias to determine how much light is received. Based on comparing the light received, each VLC system may synchronize respective clocks such that the dark slots align. The VLC systems may then transmit a data frame preamble instructing the other VLC systems to cease synchronization and use the dark slots to receive the data from the data frame. While transmitting the data frame, the VLC systems may continue to use the energy slots to prevent flicker.

17 Claims, 7 Drawing Sheets

(56) References Cited

U.S. PATENT DOCUMENTS

| | | | |
|---|---|---|---|
| 8,588,616 | B2 | 11/2013 | Langer et al. |
| 8,699,406 | B1* | 4/2014 | Charles .................. H04L 7/048 370/324 |
| 8,744,273 | B2 | 6/2014 | Riedl et al. |
| 8,873,965 | B2 | 10/2014 | Giustiniano et al. |
| 2002/0171895 | A1* | 11/2002 | Chang .................. H04J 3/0682 398/168 |
| 2004/0208632 | A1* | 10/2004 | Dietz et al. .................... 398/182 |
| 2008/0063410 | A1 | 3/2008 | Irie |
| 2009/0110405 | A1 | 4/2009 | Lee et al. |
| 2009/0196613 | A1 | 8/2009 | Linnartz |
| 2009/0214225 | A1 | 8/2009 | Nakagawa et al. |
| 2009/0297166 | A1 | 12/2009 | Nakagawa et al. |
| 2010/0135669 | A1 | 6/2010 | Kim et al. |
| 2010/0135671 | A1 | 6/2010 | Park et al. |
| 2010/0254712 | A1 | 10/2010 | Linnartz et al. |
| 2010/0284697 | A1 | 11/2010 | Bae et al. |
| 2010/0302268 | A1 | 12/2010 | Jun et al. |
| 2010/0327764 | A1* | 12/2010 | Knapp .......................... 315/250 |
| 2011/0064405 | A1 | 3/2011 | Rajagopal et al. |
| 2011/0069962 | A1* | 3/2011 | Castor .................. H04B 10/116 398/115 |
| 2011/0200338 | A1* | 8/2011 | Yokoi .......................... 398/158 |
| 2012/0001567 | A1* | 1/2012 | Knapp .................. H04L 12/282 315/291 |
| 2012/0045221 | A1 | 2/2012 | Walewski |
| 2012/0087676 | A1 | 4/2012 | Lim et al. |
| 2012/0170693 | A1 | 7/2012 | Hung et al. |
| 2013/0183042 | A1* | 7/2013 | Knapp et al. .................. 398/106 |
| 2014/0270796 | A1* | 9/2014 | Jovicic et al. ................. 398/128 |
| 2015/0102733 | A1* | 4/2015 | Knapp ............. H04L 12/40045 315/152 |

OTHER PUBLICATIONS

Schmid, Stefan et al, An LED-to-LED Visible Light Communication System with Software-Based Synchronization, 2012 IEEE Globecom Workshops, Dec. 2012, 5 pages, IEEE, Piscataway, United States.

Giustiniano, Domenico et al., Low-Complexity Visible Light Networking with LED-to-LED Communication, 2012 IFIP Wireless Days, Nov. 2012, pp. 1-23 (6 sheets), IEEE, Piscataway, United States.

U.S. Appl. No. 13/443,785, entitled Visible Light Communication With Flickering Prevention, filed Apr. 10, 2012.

Schmid, Stefan et al., Networking Smart Toys with Wireless ToyBridge and ToyTalk, The 30th IEEE International Conference on Computer Communications, Apr. 2011, IEEE, Piscataway, New Jersey, United States.

Dietz, Paul et al, Very Low-Cost Sensing and Communication Using Bidirectional LEDs, Jul. 2003, 19 pages, Mitsubishi Electric Research Laboratories, Inc., Cambridge, Massachusetts, United States.

Institute of Electrical and Electronics Engineers, IEEE Standard for Information technology—Telecommunications and information exchange between systems—Local and metropolitan area networks—Specific requirements—, 2009, IEEE, Piscataway, New Jersey, United States.

Tippenhauer, Nils Ole et al., Toys communicating with LEDs: Enabling Toy Cars Interaction, The 9th Annual IEEE Consumer Communications and Networking Conference, pp. 48-49, Jan. 2012, IEEE, Piscataway, United States.

Atmel, 8-bit Microcontroller with 4/8/16/32KBytes In-System Programmable Flash, 2009, pp. 1-100, Atmel Corporation, San Jose, United States.

Atmel, 8-bit Microcontroller with 4/8/16/32KBytes In-System Programmable Flash, 2009, pp. 101-200, Atmel Corporation, San Jose, United States.

Atmel, 8-bit Microcontroller with 4/8/16/32KBytes In-System Programmable Flash, 2009, pp. 201-300, Atmel Corporation, San Jose, United States.

Atmel, 8-bit Microcontroller with 4/8/16/32KBytes In-System Programmable Flash, 2009, pp. 301-400, Atmel Corporation, San Jose, United States.

Atmel, 8-bit Microcontroller with 4/8/16/32KBytes In-System Programmable Flash, 2009, pp. 401-440 and i-viii, Atmel Corporation, San Jose, United States.

O'Brien, Dominic C. et al., Visible Light Communications: challenges and possibilities, IEEE 19th International Symposium on Personal, Indoor and Mobile Radio Communications, pp. 1-5, 2008, IEEE, Piscataway, United States.

J. McKendry, R. Green, A. Kelly, Z. Gong, B. Guilhabert, D. Massoubre, E. Gu, and M. Dawson, High-Speed Visible Light Communications Using Individual Pixels in a Micro Light-Emitting Diode Array, Photonics Technology Letters, IEEE, vol. 22, pp. 1346-1348, Sep. 15, 2010.

Arnon, Shlomi, The Effect of Clock Jitter in Visible Light Communication Applications, Journal of Lightwave Technology, vol. 30, No. 21, Nov. 1, 2012, pp. 3434-3439, IEEE, Piscataway, United States.

802.15.7, "IEEE Standard for Local and Metropolitan Area Networks. Part 15.7: Short-Range Wireless Optical Communication Using Visible Light," Sep. 2011, pp. 1-100, Piscataway, United States.

802.15.7, "IEEE Standard for Local and Metropolitan Area Networks. Part 15.7: Short-Range Wireless Optical Communication Using Visible Light," Sep. 2011, pp. 101-200, Piscataway, United States.

S. Rajagopal, R. Roberts, and S.-K. Lim, "IEEE 802.15.7 Visible Light Communication: Modulation Schemes and Dimming Support", Communications Magazine, IEEE, vol. 50, pp. 72-82, Mar. 2012.

J. Lubacz, W. Mazurczyk, and K. Szczypiorski, "Vice over IP," Spectrum, IEEE, vol. 47, pp. 42-47, Feb. 2010.

H. Elgala, R. Mesleh, and H. Haas, "Indoor Optical Wireless Communication: Potential and State-of-the-Art," IEEE Commun. Mag., vol. 49, No. 9, pp. 56-62, 2011.

S. Mangold, "Visible Light Communications for Entertainment Networking," in Photonics Society Summer Topical Meeting, 2012 IEEE, pp. 100-101, Jul. 2012.

A. Azhar, T.-A. Tran, and D. O'Brien, "Demonstration of high-speed data transmission using MIMO-OFDM visible light communications," in Globecom Workshops, 2010 IEEE, pp. 1052-1056, Dec. 2010.

D. O'Brien, S. Quasem, S. Zikic, and G.E. Faulkne, "Multiple Input Multiple Output Systems for Optical Wireless: Challenges and Potential," in Photonics Conference (PHO), 2011 IEEE, pp. 365-366, Oct. 2011.

T. Komiyama, K. Kobayashi, K. Watanabe, T. Ohkubo, and Y. Kurihara, "Study of Visible Light Communication System using RGB LED Lights," in SICE Annual Conference (SICE), 2011 Proceedings of pp. 1926-1928, Sep. 2011.

H. Ukida, M. Miwa, Y. Tanimoto, T. Sano, and H. Yamamoto, "Visual Communication using LED Panel and Video Camera for Mobile Object," in Imaging Systems and Techniques (IST), 2012 IEEE International Conference on, pp. 321-326, Jul. 2012.

802.15.7, "IEEE Standard for Local and Metropolitan Area Networks. Part 15.7: Short-Range Wireless Optical Communication Using Visible Light," Sep. 2011, pp. 201-309, Piscataway, United States.

* cited by examiner

RELIABLE VISIBLE LIGHT COMMUNICATION WITH DARK LIGHT SYNCHRONIZATION

BACKGROUND

1. Field of the Invention

Embodiments presented in this disclosure generally relate to transmitting data using light-emitting diodes (LEDs) in a visible light communication (VLC) channel.

2. Description of the Related Art

VLC is an emerging technology in which light emitters transmit information wirelessly, using the visible light spectrum. VLC enables the interaction of consumer products such as toys and fashion in an efficient and low-cost manner. By applying VLC, devices can communicate with each other or with displays, light bulbs, camera sensors, projectors, and many other ambient light sources.

VLC is a potential low-power, low-cost alternative to traditional short-range wireless RF communications. Electronic emitters of visible light are omnipresent in a variety of applications such as televisions, displays, status indicators, and user interfaces on consumer electronic devices. In many cases, LEDs have become the preferred light source for VLC because of their low cost, low energy consumptions, and small size. LEDs can control the intensity at a frequency that is orders of magnitude higher than conventional light emitting devices. By varying the intensity of the LED light source, data messages can be communicated through visible light to a receiver that is sensitive to light.

SUMMARY

One embodiment presented in this disclosure includes a method that detects, using a first visible light system, an amount of light received during first and second dark slots of a predefined synchronization pattern. The method compares the amount of light received during the first dark slot to the amount of light received during the second dark slot and adjusts, based on the comparison, a clock in the first visible light system such that the first and second dark slots align with corresponding dark slots of a second visible light system. Moreover, the first and second visible light systems use the same synchronization pattern. The method emits light from a light source of the first visible light system during an energy slot in the predefined synchronization pattern where respective time periods of the first and second dark slots and energy slot are set to mitigate an ability of a human eye to detect a change from one of the first and second dark slots to the energy slot in the predefined synchronization pattern.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

Another embodiment includes a first visible light system that includes a light source and a controller coupled to the light source. The controller is configured to detect an amount of light received during first and second dark slots of a predefined synchronization pattern and compare the amount of light received during the first dark slot to the amount of light received during the second dark slot. The controller is further configured to synchronize, based on the comparison, a clock in the visible light system such that the first and second dark slots align with corresponding dark slots of a second visible light system where the first and second visible light systems use the same synchronization pattern. The controller is configured to emit light from the light source during an energy slot in the predefined synchronization pattern where respective time periods of the first and second dark slots and energy slot are set to mitigate an ability of a human eye to detect a change from one of the first and second dark slots to the energy slot in the predefined synchronization pattern.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

A VLC system may use semiconductor light sources (e.g., LEDs) coupled to a controller to both transmit and receive data messages. In order for a LED to transmit data, the associated controller provides a forward bias. Additionally, the VLC system may use the LED as a receiver if a reverse bias is applied. In this manner, a single LED may be used for bi-directional communication in a wireless system.

Light sources that transmit or receive data in a VLC system may emit light that flickers. Flickering is observed when the human eye is able to perceive the fluctuations in the intensity of light emitted by a light source. The intensity of the light may change because the light source is transmitting a message or because the LED light source switches between reverse bias (i.e., no light is emitted) and forward bias (i.e., light is emitted). To prevent flicker, the light sources may use patterns or schemes that ensure a user perceives a constant amount of light. That is, the light sources may switch between emitting light and not emitting light at a frequency that is imperceptible to the human eye. Instead, the user perceives only a constant, average light intensity.

In one embodiment, before transmitting data frames in an ad hoc VLC environment that includes at least two VLC systems, the light sources of the respective VLC systems may synchronize. To do so, the light sources may transmit an idle pattern that includes a plurality of dark slots (i.e., when the LED is reverse biased) and energy slots (i.e., when the LED is forward biased). During the dark slots, a controller coupled to the light source may determine the amount of light striking the light source. For example, the idle pattern may include two consecutive dark slots during which the controller may measure the light in each dark slot and adjust the clock accordingly. Each VLC system may transmit the idle pattern and use the dark slots to adjust their clocks. Because each light source is synchronizing during the dark slots, the VLC systems may have advantages over a VLC environment where only one VLC system adjusts its clock based on the light emitted from a light source from a different VLC system. Eventually, the light sources are synched and a data frame may be transmitted between the light sources.

Before transmitting a data frame, a light source may transmit a start frame delimiter (SFD). The SFD may be a predefined pattern recognizable by the controllers coupled to the light sources. The VLC systems may, while transmitting the idle pattern, record data in sliding windows. For example, the controllers coupled to the light source may store the data detected during the last eight dark slots. If the recorded data matches the predefined SFD pattern, then the controller determines that a light source is about to transmit a data packet, and in response, switches the light source from idle mode to receiver mode. Once the frame is received, the VLC system that received the data frame may then transmit an acknowledgement frame back to the transmitting VLC system. In one embodiment, both the transmitting and receiving VLC systems may return to idle mode and again resynchronize their clocks. In this manner, two or more light sources in a VLC communication channel may synchronize and transmit data in an ad hoc communication environment.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A VLC Environment

Figure 1:
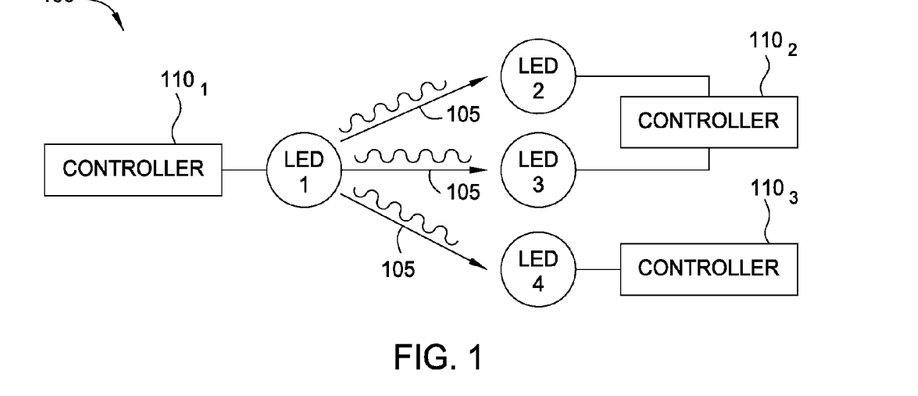
FIG. 1 illustrates a VLC environment comprising LEDs, according to an embodiment described herein.

FIG. 1 is a VLC environment comprising LEDs, according to one embodiment described herein. Specifically, LED 1 performs VLC by transmitting data using visible light as shown by arrows 105. Although specific reference is made herein to LEDs, the embodiments disclosed herein may be used with any light source capable of VLC. For example, the light source may be a semiconductor light source that emits visible light of a particular wavelength (i.e., a particular color) or a light source that emits visible light comprising a combination of different wavelengths (i.e., white light). Moreover, the term "visible light" corresponds to electromagnetic radiation that is can be detected by the human eye—i.e., electromagnetic radiation with a wavelength of approximately 390 to 750 nm in the electromagnetic spectrum.

Each LED is associated with at least one controller $110_{1-3}$ (e.g., a microprocessor) to form a VLC system. The controllers 110 may include a current or voltage source for driving the LEDs 1-4. For example, the controllers 110 may modulate the emitted light from a high intensity to a low intensity to transmit a digital signal. Specifically, the idle pattern or the scheme used to transmit a data packet or frame may be designed to prevent flicker so that the user perceives a constant light intensity. However, this disclosure is not limited to any particular type of modulation schema.

Each LED may be co-located on, for example, a garment, toy, device, or light fixture, as its associated controller 110. Thus, LED 1 is located on the same object as controller $110_1$, LEDs 2 and 3 are located on the same object as controller $110_2$ and LED 4 is located on the same object as controller $110_3$. Further, LEDs 2-4 (and their controllers $110_{2,3}$) may be co-located on the same object while LED 1 may be located on a different object. Accordingly, in order to communicate between objects, the controllers 110 use one of their associated LEDs to transmit data using VLC.

In system 100, the LEDs may be used as both receivers and transmitters (i.e., each LED is capable of bi-directional communication). That is, at the time shown in FIG. 1, LED 1 transmits data while LEDs 2-4 detect the transmitted data, but at a different time, LED 2 may transmit data while LEDs 1, 3, and 4 receive the transmitted data. Advantageously, using LEDs to both transmit and receive data obviates the need for a separate photodiode to detect transmitted data.

LEDs offer other advantages over using photodiodes besides simplifying the system 100. LEDs are wavelength selective in reception with a sensitivity region that is slightly wider than the LED's spectral emission profile. Thus, a LED that is currently detecting incident light may be considered as a special type of photodiode. Generally, an LED is sensitive to wavelengths equal to or shorter than the predominant wavelength it emits. For example, a green LED is sensitive to blue light and to some portion of green light but not to yellow or red light. Accordingly, a system that uses LEDs as receivers may need less optical filters (or no optical filtering) compared to VLC systems that use different light sources. This characteristic means LEDs inherently filter out (i.e., ignore) incident light outside of their sensitivity region, and thus, ambient light (e.g., sunshine) that causes interference in a VLC system may have less of an effect on a LED than a typical photodiode that indiscriminately detects a wide spectrum of visible light.

Moreover, using light sources with a limited sensitivity region permits the VLC environment 100 to be divided into different optical channels based on wavelength. For example, assume that LEDs 1 and 2 are sensitive to only red light (i.e., 620-750 nm wavelength) while LEDs 3 and 4 are sensitive primarily to violet light (i.e., 380 nm-450 nm wavelength). LED 1 may transmit data to LED 2 in parallel with LED 3 transmitting data to LED 4 even if the light emitted by LED 1 and 3 strikes LED 2 and 4. Because LED 4 is insensitive to red light, in this example, the associated controllers $110_{2,3}$ cannot detect the data transmitted in a different optical channel.

In one embodiment, the different VLC systems may be organized into a mesh network. One controller may receive a data packet using one LED and forward the data packet using a second LED to an LED connected to another controller which is out of range of the initial transmission. Thus, the mesh network permits a VLC system to rely or forward received data packets to other VLC system that may have not received the original transmission.

Figure 2A:
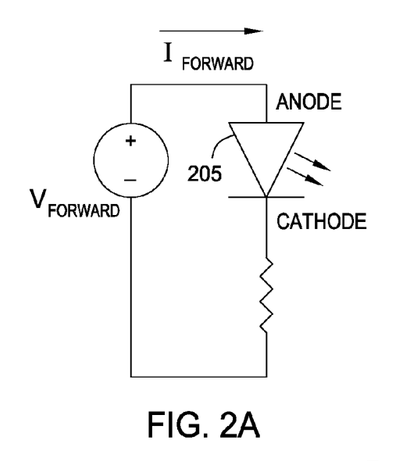
FIGS. 2A-2B are circuit models of forward and reverse biased LEDs, according to embodiments described herein.

FIGS. 2A-2B are circuit models of forward and reverse biased LEDs, according to embodiments described herein. As shown, FIG. 2A illustrates a circuit model of a forward biased LED. The voltage supply ($V_{FORWARD}$) forward biases the diode 205 (e.g., a P-N junction) such that current ($I_{FORWARD}$) flows from the anode to the cathode. As a result of this bias, charge carriers combine and release energy in the form of a photon which has a particular wavelength (i.e., color).

During energy slots, forward biasing the diode 205 may correspond to an "ON" signal. To transmit an "OFF" signal, voltage source may not apply any voltage bias to the diode 205 (i.e., no current flows in the LED) or reverse bias diode 205 such that no light is emitted. Alternatively, the voltage source may use two different voltages to forward bias the diode, thereby generating two different levels of intensity transmitted by the diode 205. The greater level of intensity may correspond to the "ON" signal while the lesser level of intensity may correspond to "OFF" signal, or vice versa.

Figure 2B:
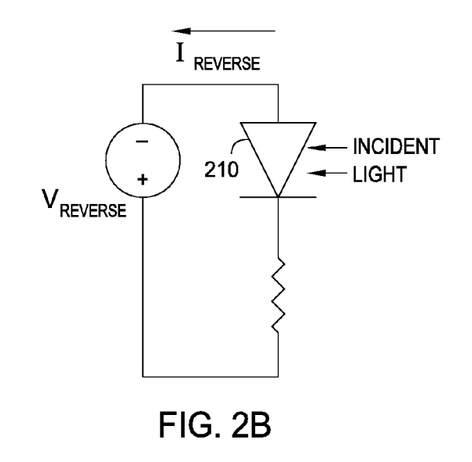

FIG. 2B illustrates a circuit model of a reverse biased LED. As one of ordinary skill in the art will recognize, a reverse biased LED may also be modeled using a current source, a capacitor, and a resistor. As shown here, the polarity of the voltage source is reversed ($V_{REVERSE}$) which causes the P-N junction of the diode 210 to also be reversed. A small current ($I_{REVERSE}$) results which flows in the opposite direction of $I_{FORWARD}$. Typically, $I_{FORWARD}$ is a few mA while $I_{REVERSE}$ is only a few pA (also called a dark current). Because $I_{REVERSE}$ is so small, any incident light (i.e., photons) with a wavelength in the sensitivity region of the LED that strikes the depletion region of the P-N junction may significantly increase $I_{REVERSE}$ (e.g., doubling or tripling its value). Specifically, the incident light generates additional charge-carriers in the depletion region which may be swept out of the depletion region by the internal electrical field, thereby increasing the current flowing in the LED—i.e., increasing $I_{REVERSE}$. A controller can detect this change in $I_{REVERSE}$ and thus determine the intensity of the incident light.

In one embodiment, the change in $I_{REVERSE}$ may be directly measured by a controller 110 to determine the intensity of the light. However, measuring the difference between such small currents (e.g., 1 pA versus 2 pA) may be impossible for a typical analog to digital converter (ADC) pin of a microcontroller. Instead of using more expensive or bulky equipment, a capacitor may be used to determine the incident light intensity.

Figure 3:
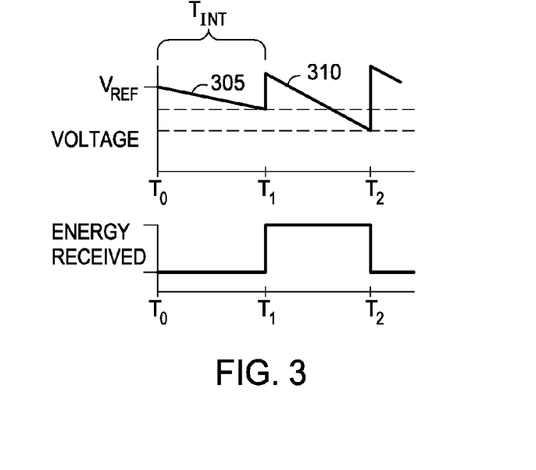
FIG. 3 is a timing diagram of discharging a capacitance associated with an LED, according to an embodiment described herein.

FIG. 3 is a timing diagram of discharging a capacitance associated with an LED, according to an embodiment described herein. Before measuring the incident light, a capacitor is charged to a reference voltage ($V_{REF}$). Then, the capacitor is permitted to discharge when the LED is reversed biased as shown in FIG. 2B. At the end of some integration period ($T_{INT}$), the remaining charge or voltage of the capacitor is measured by the ADC pin on a controller.

In one embodiment, instead of using a separate capacitor, the internal capacitance of a reverse biased P-N junction in the LED may be used. As discussed previously, incident light increases $I_{REVERSE}$, and thus, increases the rate at which the capacitance associated with an LED discharges.

FIG. 3 illustrates two time periods of length TINT during which the LED is reversed biased. From T0 to T1 (e.g., a time period similar to a data or dark slot) the LED is not struck by incident light, and thus, no additional energy is added to the LED. Line 305 illustrates the rate at which the voltage (or charge) across the capacitor decreases during this time period. At T1, the capacitance is recharged to $V_{REF}$. During the time period from T1 to T2, however, incident light does strike the depletion region of the LED which increases $I_{REVERSE}$. As shown by line 310, the additional current discharges the capacitor more quickly than during T0 to T1 and results in a steeper slope than the slope associated with line 305. At the end of each time interval, the controller can measure the voltage. If the voltage is, for example, above a predefined threshold voltage, then the controller determines that an OFF signal was received; if below the threshold, then the controller determines that a ON signal was received. Because the measured voltage may be between 0-5 V, an ADC pin on a typical microcontroller may be capable of detecting which bit was received in the time interval without the need of more expensive or additional equipment.

Transmitting Data in a VLC Environment

Figure 4:
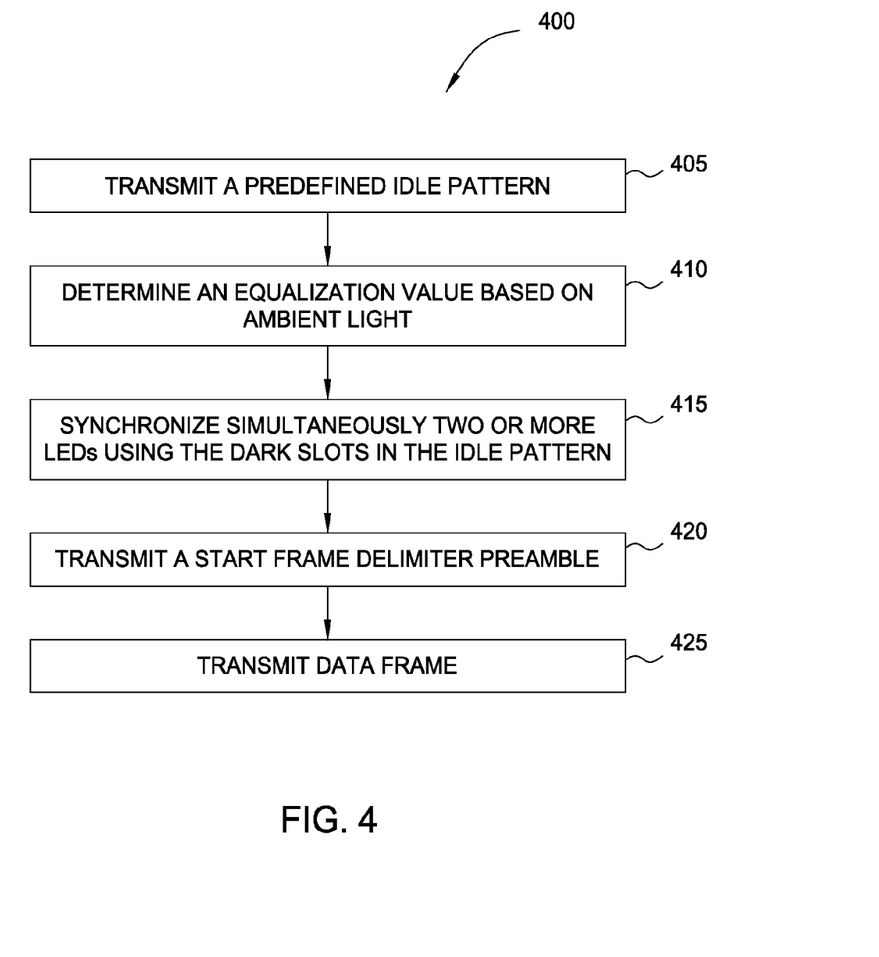
FIG. 4 illustrates a method for ad hoc VLC between a plurality of LEDs, according to an embodiment described herein.

FIG. 4 illustrates a method 400 for ad hoc VLC between a plurality of LEDs, according to an embodiment described herein. At block 405, an LED powers on and begins to transmit a predefined idle (or synchronization) pattern. The LED may be part of a toy that a user, for example, turns on using an on/off switch coupled to the LED's controller. Moreover, the LED may be part of a group of LEDs that are controlled by the same controller.

As discussed previously, the idle pattern may be designed to eliminate flicker. The idle pattern may have a plurality of dark slots (i.e., when no light is emitted) and energy slots (i.e., when light is emitted). If the idle pattern is a dark slot followed by an energy slot, to prevent flicker, the durations of the slots may be less than 30 milliseconds (i.e., the LED switches between dark and energy slots at a frequency greater than 33 Hz). If the duration of the slots is increased, the user may begin to perceive the transition between the ON signal emitted during the energy slot and the OFF signal emitted during the dark slot. Instead, if the idle pattern is an energy slot followed by two consecutive dark slots followed by another energy slot, the durations of the slots may be less than 15 milliseconds. Here, because there are consecutive dark slots and energy slots, the duration of each slot is halved so the combined duration of two consecutive dark slots or two consecutive energy slots is less than or equal to the 30 millisecond duration discussed in the previous example. In this manner, the duration of the slots may be adjusted to suit any desired idle pattern and still prevent flicker. The current embodiments assume that the dark slots and the energy slots are the same duration but this is not a requirement. In other embodiments, the slots may have varying durations but still be designed to mitigate flicker.

In the embodiments that follow, it is assumed that the predefined idle pattern is an energy slot followed by two consecutive dark slots followed by another energy slot that repeats continually. However, the embodiments herein are not limited to such and may include any idle pattern configured to prevent flicker.

At block 410, the controller attached to an LED may use the dark slots in the idle pattern to determine a correction value based on ambient light. In one embodiment, the controller may reverse bias the LED during the consecutive dark slots in the idle pattern to detect light striking the surface of the LED. However, switching from forward biasing the LED during an energy slot to reverse biasing the LED during a dark slot may result in a different reading of light intensity during the first dark slot than the second dark slot even if the same amount of light strikes the LED during both dark slots. That is, because the LED transitions from being forward biased to reverse biased, the dark slot following the energy slot (i.e., the first dark slot) may have a different voltage value than the subsequent dark slot (i.e., the second dark slot) even if the values should be the same. This error results from the physics of changing the semiconductor materials of the LED from being forward biased to reverse biased. As discussed in FIG. 3, the amount of light striking the LED changes the rate at which the capacitor discharges. However, even if the light remains constant during the consecutive dark slots, the final voltage at the end of the first dark slot may be different than the final voltage at the end of the second dark slot because of this error.

To compensate, when first powering up, the controller may assume that no other LEDs are within range. That is, the controller assumes that only the ambient light of the environment is striking the LED. During consecutive dark slots, the controller may generate an equalization value based on the voltage difference between the first dark slot and the second dark slot. For example, if the analog to digital converter in the controller assigns a voltage value of 1.3 V to the first dark slot and a voltage value of 1 V to the second dark slot, the equalization value may by the difference—e.g., 0.3 V. In subsequent dark slot measurements, the controller may subtract the 0.3 V offset to the voltage produced by the first dark slot in each dark slot set to equalize the measurements. Thus, if only ambient light continues to strike the LED during the dark slots, the voltages measured by the controller (after equalization) will be the same. In one embodiment, the controller may determine the equalization value during the first few milliseconds that the LED is powered on. For example, the controller may average over a few milliseconds the voltage difference between a plurality of dark slot sets to determine the equalization value.

At block 415, each controller coupled to respective LEDs may synchronize its clock using the dark slots in the idle pattern. For example, two LEDs may be powered up and generate the equalization value using the ambient light. Later, a user may bring the LEDs within range of each other such that the light emitted by the LEDs during the energy slots of the idle pattern affect the slope at which the capacitor discharges during the dark slots of the idle pattern.

Figure 5:
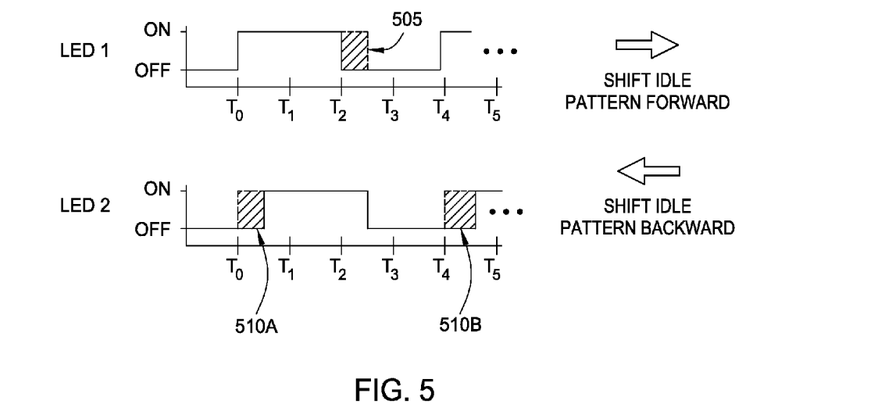
FIG. 5 is a timing diagram for synchronizing clocks associated with two LEDs, according to an embodiment described herein.

FIG. 5 is a timing diagram for synchronizing clocks associated with two LEDs using the dark slots in the idle pattern. Here, both LED 1 and LED 2 transmit the same idle pattern—e.g., "ON", "OFF", "OFF", and "ON". Because LEDs 1 and 2 are powered up at different times, the idle patterns may not align. Additionally, even if the clocks are aligned at one point in time, because of (small) differences in the oscillation frequencies, the clocks may begin to drift and need to be re-synchronized. To synchronize the clocks of the respective controllers, and thus, the patterns, each controller measures and compares the amount of energy received during the consecutive dark slots. Because the clock of LED 2 trails the clock of LED 1, LED 2 measures additional energy during its second dark slot relative to the first dark slot. For example, during the first dark slot only ambient light strikes the LED; however, during the second dark slot, LED 1 emitting light during an energy slot as shown by portions 510A and 510B. The light emitted by LED 1 during portions 510A and 510B may cause the voltage across the capacitor to decrease faster than in the first dark slot. After equalization, the voltage measured during second dark slot is less than the voltage measured during the first dark slot. From this, the controller determines that the idle pattern should be shifted backwards (e.g., the controller should sample earlier or the clock is shifted backward).

In contrast, the light emitted by an energy slot in LED 2 causes more light to strike LED 1 during the first dark slot than the second dark slot as shown by portion 505. In response, the controller for LED 2 may shift the idle pattern forward (e.g., the controller should sample later or the clock is shifted forward). In one embodiment, the controllers may make incremental changes when shifting the idle patterns or changing the clocks. As such, synchronizing the LEDs may use several repetitions of the idle pattern and adjustments before the patterns are aligned. In another embodiment, the controller may adjust how much to shift the pattern or change the clock based on the voltage difference between the first and second dark slots. For example, the controller may shift the pattern more as the difference between the voltages measured in the consecutive dark slots increases. In this manner, the LEDs may align faster than if the controller performs the same incremental shift regardless of the voltage difference.

Advantageously, aligning the darks slots of one LED to the dark slots of the other LED permit the both controllers to align the idle patterns simultaneously. Because the controllers align simultaneously—i.e., the controllers for LED 1 and LED 2 are able to synchronize to each other's dark slots in parallel—the convergence of the idle patterns may take less time or be more accurate than embodiments where LED 1 synchronizes to LED 2 based on the light emitted by the LED 2 during the energy slots—i.e., where only one of the two LED's is shifting its clock.

Figure 6:
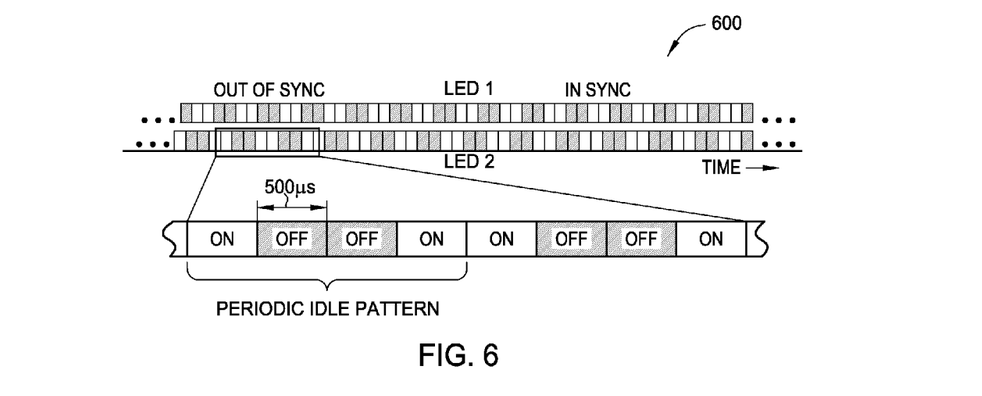
FIG. 6 illustrates synchronizing LEDs using a predefined idle pattern, according to an embodiment described herein.

FIG. 6 illustrates synchronizing LEDs using a predefined idle pattern, according to an embodiment described herein. Timeline 600 illustrates two LEDs whose idle patterns are initially out-of-synch but, using the techniques described above, become synchronized. The dark shaded slots are dark slots during which an OFF signal is transmitted, while the light shaded slots are energy slots during which an ON signal is transmitted. Advantageously, both LED 1 and LED 2 may update their clocks based on the light detected during the respective dark slots. That is, LED 1 may sample earlier while LED 2 samples later.

The close up of timeline 600 illustrates that each slot in the idle pattern is approximately 500 microseconds. However, the duration of the time slots may be any desired time period. For example, the duration may vary depending on the type and sophistication of the LEDs or the controllers used in a VLC system. Nonetheless, to prevent flicker, the total duration of consecutive dark or energy slots should not exceed approximately 30 milliseconds.

As additional LEDs come into range, they too may be synchronized to LEDs 1 and 2. The already synchronized LEDs may be thought of as one logical LED. Thus, as a new LED comes into range of the synchronized LEDs, the VLC channel behaves much like is shown in timeline 600 where the new LED and the already synchronized LEDs simultaneously shift their clocks until the idle patterns are aligned.

Returning to FIG. 4, at block 420, one of the synchronized LEDs transmits a SFD. The SFD may be a preamble to a data frame that serves as a signal to the other synchronized LEDs to switch from an idle mode to a receive mode. As used herein, the LED that is transmitting data to other LEDs in the VLC channel is referred to as the transmitter LED while the LEDs that are receiving the SFD preamble and the data frame are the receiver LEDs. In one embodiment, the transmitter LED sends the SFD preamble to switch the receiver LEDs from idle mode to receive mode. Instead of attempting to synchronize its clock based on the light detected during the dark slots, the receiver LEDs may begin to interpret the light detected during the consecutive dark slots as data bits
e.g., a logical "1" or "0". A more detailed explanation of this process will be discussed later.

At block 425, the transmitter LED transmits the data frame to the one or more receiver LEDs. In one embodiment, the transmitter LED uses a transmission schema that maintains a ratio between ON and OFF signals of approximately one—i.e., the transmitter LED emits approximately the same number of ON signals as OFF signals. For example, the transmitter LED may use a 2-pulse position modulation (2-PPM) bit encoding with a 50% duty cycle. This Manchester bit code encodes each logical bit using the ON and OFF signals. For example, the transmitter LED emits an ON signal followed by an OFF signal to represent bit 0 and an OFF signal followed by an ON signal to represent bit 1. Table 1 illustrates the truth table for this encoding schema.

TABLE 1

| First Symbol | Second Symbol | Bit |
|---|---|---|
| ON | OFF | 0 |
| OFF | ON | 1 |

The 2-PPM bit encoding is just one example of an encoding scheme. Any encoding scheme which enables the transmission of data while maintaining a constant ratio of ON and OFF signals to mitigate flicker may be used in the embodiments disclosed herein.

When receiving the data frame, the receiver LED continues to follow the idle pattern. However, instead of using the dark slots to synchronize, the LED determines if the transmitter LED is emitting an ON or OFF signal. Thus, in one embodiment, for each dark slot set, the transmitter LED receives one bit. That is, if the LED receives an ON signal during the first dark slot and an OFF signal during the second dark slot, the controller determines that the transmitter LED has sent a logical 0. Instead, if the LED receives an OFF signal during the first dark slot and an ON signal during the second dark slot, the controller determines that the transmitter LED has sent a logical 1. In this manner, the transmitter LED sends data during the dark slots of the idle pattern of the synchronized receiver LED.

To increase the data throughput, in one embodiment, the receiver LED may decode two bits for each two dark slots. Here, if the 2-PPM bit encoding protocol is followed, if the receiver LED detects an OFF signal in the first dark slot then it assumes the transmitter LED sent an ON signal in the previous energy slot. Thus, an OFF signal in the first dark slot indicates a logical 0. Conversely, if the receiver LED detects an ON signal in the first dark slot, it assumes the transmitter LED emitted an OFF signal during the previous energy slot which represents a logical 1. During the second dark slot, if the receiver LED detects an OFF signal then it assumes the transmitter LED will emit an ON signal during the subsequent energy slot, thereby indicating a logical 1. However, if the receiver LED detects an ON signal during the second dark slot then it assumes the transmitter LED will emit an OFF signal during the subsequent energy slot, thereby indicating a logical 0. In this manner, the transmitter LED may transmit two decoded bits during two consecutive dark slots. For the following embodiments, it is assumed this technique is how the transmitter LED and receiver LED transmit and receive data, however, the embodiments are not limited to such.

During the energy slots of the idle pattern, the transmitter LED may again emit an ON and OFF signal to maintain a constant ratio of ON and OFF signals to reduce flicker. That is, transmitting the bits as discussed above ensures that the transmitter LED does transmit the same signal for more than two slots. In this manner, both the transmitter and receiver LEDs may maintain a constant light intensity to the perspective of a human user.

Figure 7:
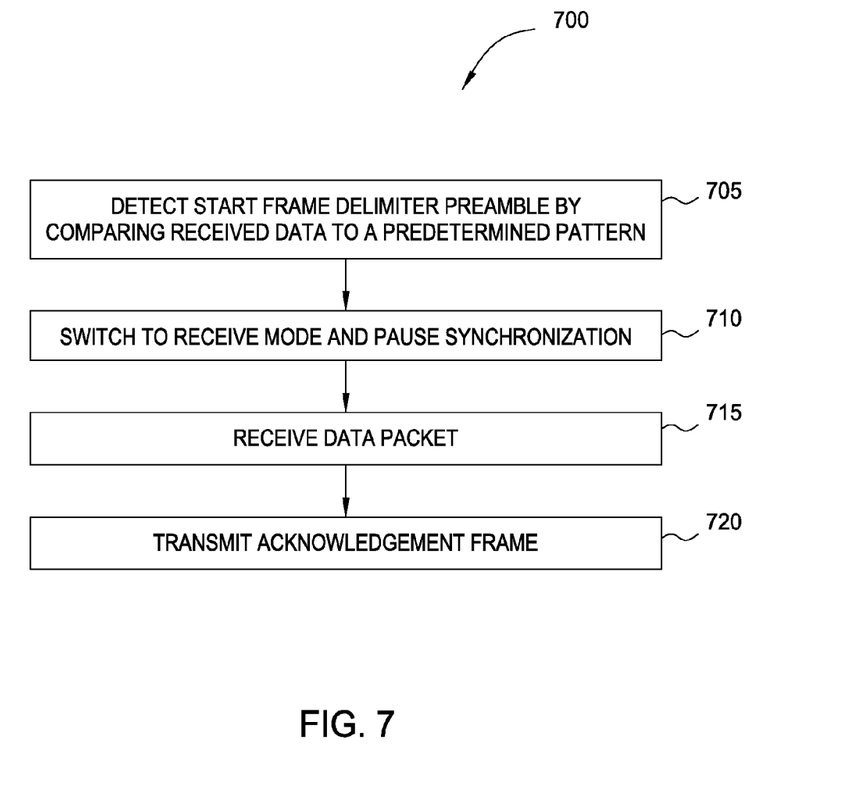
FIG. 7 illustrates a method of receiving a data frame using VLC, according to an embodiment described herein.

FIG. 7 illustrates a method 700 of receiving a data frame using VLC, according to an embodiment described herein. In one embodiment, method 700 begins after at least two LEDs have previously been synchronized using the idle pattern shown in FIG. 5. At block 705, one of the synchronized LEDs transmits the SFD preamble.

Figure 8A:
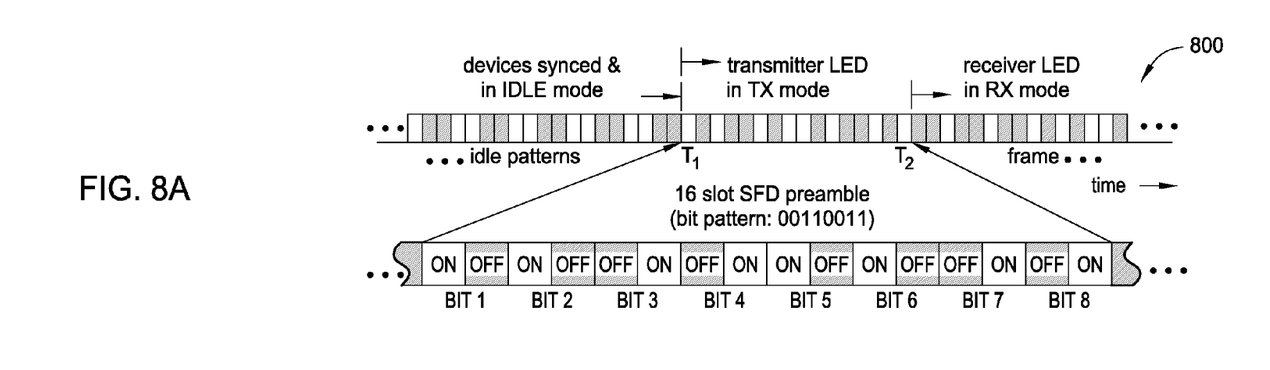
FIGS. 8A-8B illustrate transmitting a start frame delimiter pattern before transmitting a data frame, according to one embodiment described herein.
Figure 8B:
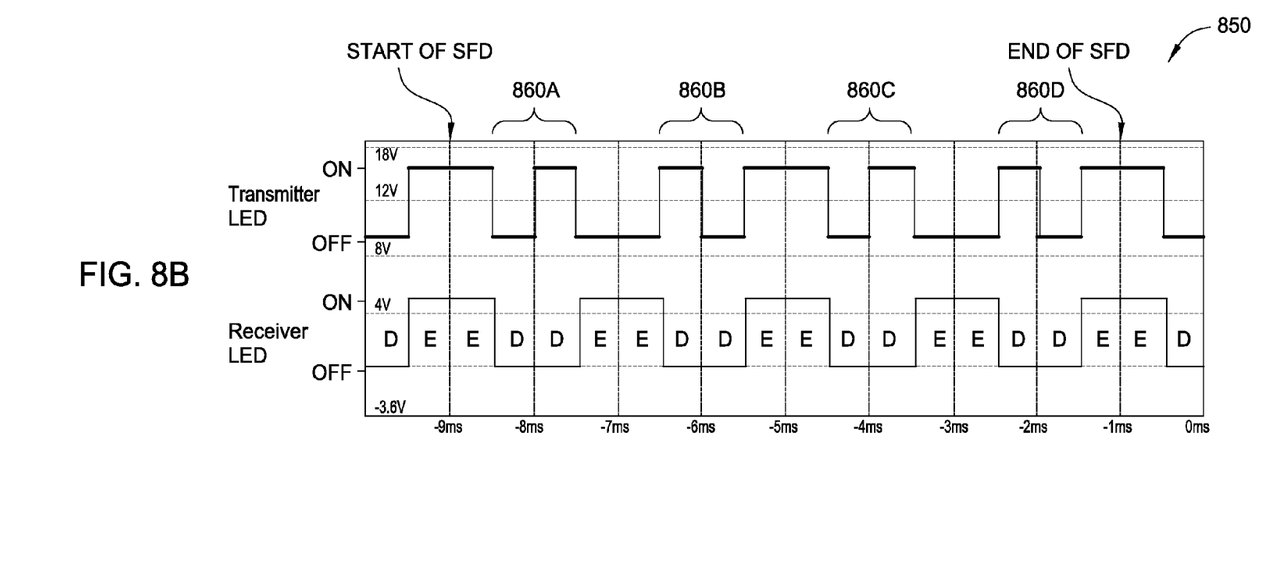

FIGS. 8A-8B illustrate an example SFD preamble that includes sixteen time slots. Specifically, FIG. 8A illustrates a timeline 800 for the transmitter LED. At the beginning of timeline 800, the transmitter LED follows the idle pattern—ON, OFF, OFF, and ON. At time $T_1$, the transmitter LED begins to transmit the SFD preamble. The close up in FIG. 8A shows the bit pattern for the eight bits encoded in the sixteen-slot SFD preamble—e.g., 00110011. At time $T_2$, the transmitter LED begins to transmit the data frame.

FIG. 8B illustrates in chart 850 the voltage waveforms of the signals transmitted by the transmitter LED and receiver LED during $T_1$ and $T_2$ of timeline 800. As shown, the transmitter LED transmits the predefined SFD preamble while the receiver LED continues to follow the idle pattern. The SFD pattern, like the idle pattern, may be preconfigured in order to prevent flicker. The SFD pattern shown is non-limiting example of a possible SFD pattern. The present embodiments may be used with any SFD pattern that performs the function described herein.

During the dark slots of the idle pattern (labeled as "D" in chart 850), the receiver LED detects the amount of light emitted by the transmitter LED. Because the receiver LED is still in idle mode, the ON and OFF signals transmitted by the transmitter LED during time periods 860A-860D will cause the receiver LED to adjust its clock (i.e., either sample earlier or sample later). For example, because the transmitter LED emits an OFF signal and an ON signal during period 860A, the receiver LED's controller shifts the idle pattern backwards. However, this shift is then compensated during the next dark slot set at time period 860B when the transmitter LED transmits an ON signal followed by an OFF signal. In response, the receiver LED's controller shifts the idle pattern forwards—i.e., back to the original position. This process repeats during the next two dark slot sets as shown by periods 860C and 860D. In this manner, the SFD preamble is configured to keep the transmitter LED and receiver LED synchronized even when the transmitter LED stops following the idle pattern and begins to transmit the SFD preamble.

In one embodiment, the SFD preamble is used to set an adaptive threshold for transmitting data. To be able to distinguish between an ON signal and OFF signal, the receiver LED needs to find a threshold somewhere in between. The receiver LED compares the light intensity received during one of the dark slots to the threshold to determine if the transmitter LED emitted an ON or an OFF signal. To set this threshold, the SFD preamble transmits one ON signal and one OFF signal during each dark slot set. The receiver LED's analog-to-digital converter changes the voltages corresponding to each of the dark slots into a value (e.g., a value between 0 and 1023) which then can be averaged. For example, the sixteen slot SFD shown in FIGS. 8A and 8B provides the receiver with four dark slots where the transmitter LED emits an ON signal and four dark slots where the transmitter LED emits an OFF signal. The controller may average these eight digital values to derive the adaptive threshold to use when receiving the data frame.

In addition to setting the threshold, the controller may determine, based on the ON and OFF signal pattern, that one of the LEDs is transmitting an SFD preamble. That is, when in synchronization mode, each controller may maintain a sixteen slot window of previous measured values which is used to continually update the adaptive threshold. In addition, the controller may evaluate the window to determine if the measured values match the predefined SFD preamble pattern. Here, the controller determines if it received an OFF signal followed by an ON signal during the first dark slot set, an ON signal followed by a OFF signal during the second dark slot set, an OFF signal followed by an ON signal during the third dark slot set, and an ON signal followed by an OFF signal during the fourth dark slot set. For example, the controller may compare the digital values measured at the end of each dark slot to see if they match (with some variation) this pattern. If so, the controller is able to determine that the receiver LED has received a SFD preamble from one of the synchronized LEDs.

Returning to FIG. 7, at block 710, the controller of the receiver LED may switch its mode from idle mode to receiver mode based on identifying the SFD pattern. In response, the controller may cease attempting to adjust its clock based on the amount of light received during the dark slots and instead attempt to determine whether the transmitter LED is emitting an ON or OFF signal using the adaptive threshold. To do so, in one embodiment, the receiver LED may fix the adaptive threshold to the value formed based on the received SFD preamble. By using the SFD preamble to set the threshold, each receiver LED has a customized adaptive threshold that represents the communication channel between itself and the transmitter LED.

At block 715, the receiver LED begins to receive the data frame from transmitter LED. The receiver LED continues to transmit the idle pattern and uses the dark slots to determine if the receiver LED is transmitting a logical 1 or 0 based on the bit encoding scheme. For example, if the digital value derived from the analog voltage measured at the end of a dark slot is above the adaptive threshold, the LED has received an OFF signal, but if the digital value is below the threshold, the LED has received an ON signal. Assuming the transmitter LED uses 2-PPM, if the receiver LED detects an OFF signal followed by an ON signal during a dark slot set, this represents a logical 1, while an ON signal followed by an OFF signal represents a logical 0. In this manner, the transmitter LED uses the consecutive dark slots to transmit the data bits of the data frame to the receiver LED. A more detailed explanation of the data frame will be provided below.

Because the receiver LED continues to transmit the idle pattern (even though the LED is not in the receiver mode), the user does not perceive any flicker associated with the receiver LED while the LED receives the data frame.

At block 720, the receiver LED transmits an acknowledgement (ACK) frame back to the transmitter LED. For example, the data frame may include error correction bits that the receiver LED's controller may use to determine if the data has been received properly. If so, the ACK frame is transmitted to the transmitter LED. During this time, the controller may change from receive mode to transmit mode. In the transmit mode, the receiver LED may no longer follow the idle pattern. As will be discussed later, the transmitter LED may also change modes after transmitting the data frame from the transmit mode to the receiver mode and begin emitting the idle pattern. During the dark slots, the transmitter LED receives the ACK frame from the receiver LED. Because the VLC environment may include a plurality of receiver LEDs, each receiver LED may transmit an ACK frame back to the transmitter LED. Nonetheless, because the ACK frame is predefined and the receiver LEDs remain synchronized, to the perspective of the transmitter LED, the plurality of transmitted ACK frames appear as one single ACK frame. Alternatively, in one embodiment, the ACK frames may not be transmitted. Instead, the ACK frame may be transmitted if the VLC systems generate a mesh network rather than the broadcast network shown in FIG. 1.

Upon transmitting the ACK frame, both the receiver and transmitter LEDs may return to the idle mode and transmit the idle pattern. In one embodiment, after transmitting each data and ACK frame pair, the LEDs may return to the idle mode in order to resynchronize their clocks. For example, the individual clocks on the controllers may drift. Thus, in order to minimize the likelihood of receiving inaccurate data, the LEDs may return to idle mode after each data/ACK frame exchange.

Figure 9:
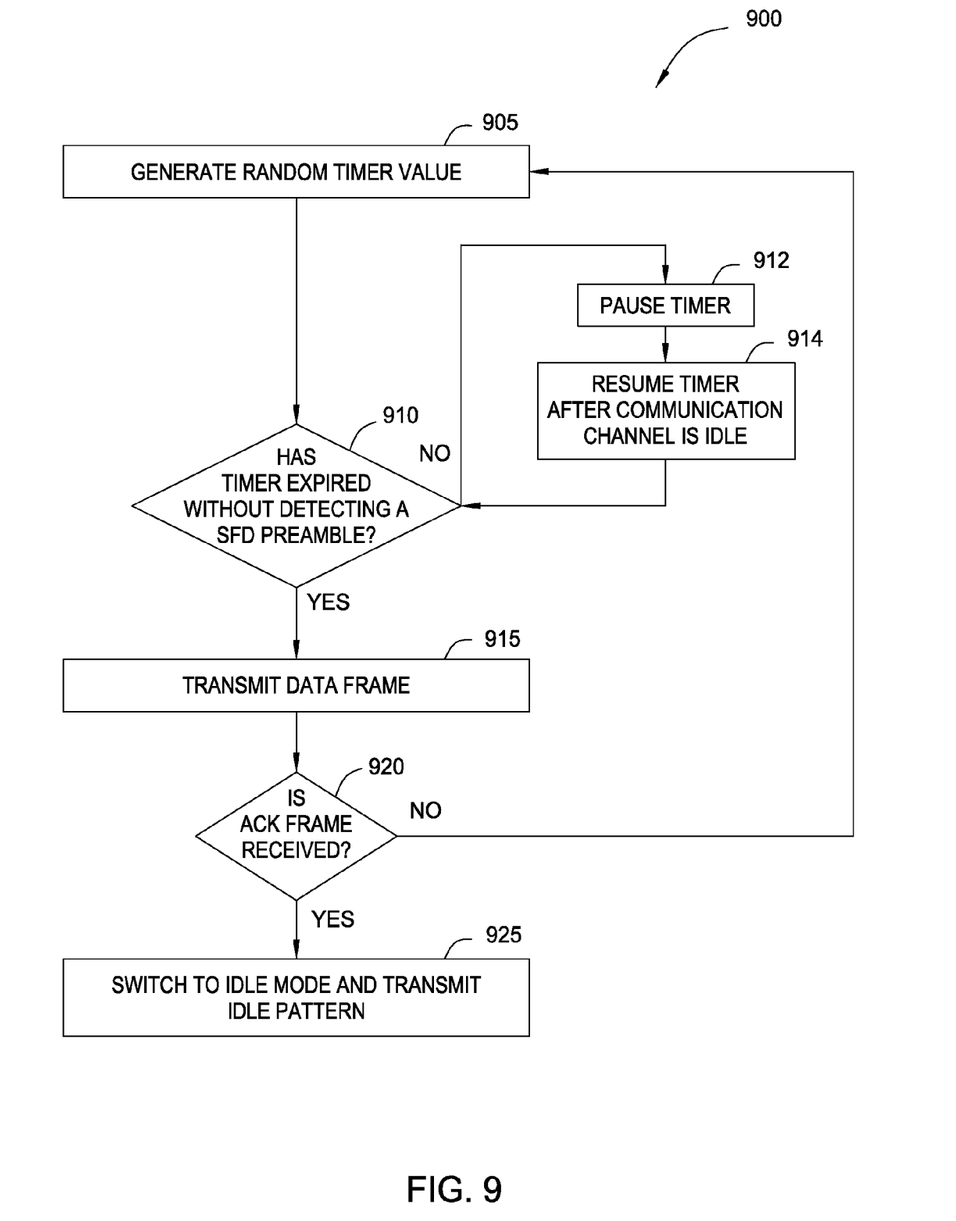
FIG. 9 illustrates a method for transmitting a data frame using VLC, according to an embodiment described herein.

FIG. 9 illustrates a method 900 for transmitting a data frame using VLC, according to an embodiment described herein. While method 700 of FIG. 7 focused on data transmission from the perspective of the receiver LED, method 900 focuses on data transmission from the perspective of the transmitter LED. At block 905, the transmitter LED's controller selects a random number as a timer value. The timer value may be used to reduce the likelihood of data collision as well as increase the ability of all LEDs to access the ad hoc system to transmit a data frame. In one embodiment, the transmitter LED may select the timer value upon receiving a request from, for example, a user to transmit a data frame to synchronized LEDs.

In one embodiment, the random value may be based on a number of contention windows where each window is the same number of slots as the SFD preamble. For example, the VLC system may have 10 different contentions windows where each window is 16 slots long (corresponding to the length of the SFD preamble shown in FIGS. 8A and 8B). When a transmitter LED wants to send a data frame in the VLC system, the controller selects a random number to select which contention window it is permitted to use (e.g., a random number between 1 and 10).

At block 910, the transmitter LED waits until the timer value expires before transmitting the SFD preamble to the other LEDs. That is, the transmitter LED may remain in the idle mode until the time expires. For example, assume that the time value was randomly set to 2. This means that the transmitter LED waits for two full contention windows before attempting to transmit the SFD preamble. However, if the transmitter LED detects a SFD preamble during the first two contention windows, at block 912, the transmitter LED will pause the timer and switch to receiver mode to receive the data packet. After transmitting an ACK frame (assuming the packet was received correctly) and the communication channel is idle, at block 914, the transmitter LED may again resume the timer to the random value and wait until the time expires. Alternatively, the transmitter LED may select a different random timer value rather than using the previous timer value. Regardless, as the transmitter LED waits for the timer value to expire, the LED may continue to follow the idle pattern to synchronize the transmitter LED with the other LEDs.

Figure 10:
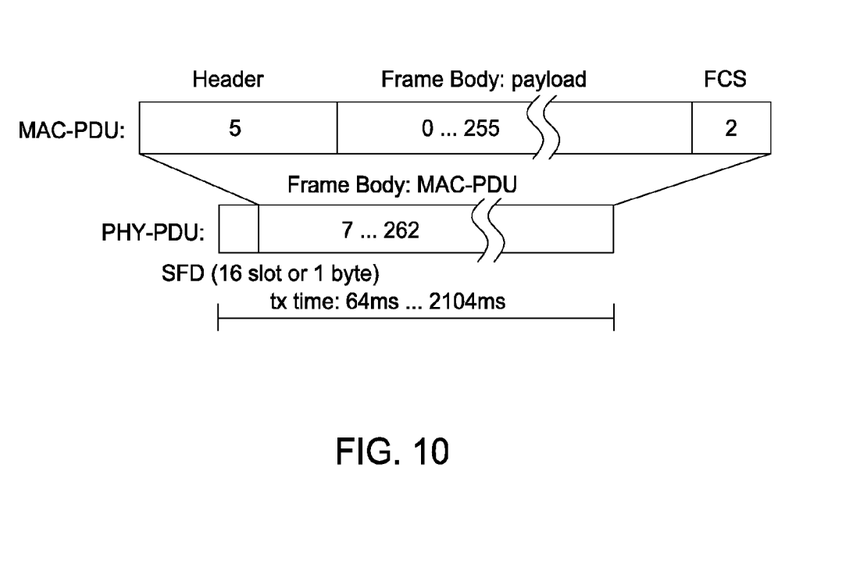
FIG. 10 illustrates a transmitted data frame packet, according to an embodiment disclosed herein.

Once the timer value expires without detecting a SFD preamble, at block 915, the transmitter LED transmits the SFD preamble and the data frame. An example of the data frame is shown in FIG. 10. Specifically, FIG. 10 illustrates a Medium Access Control-Protocol Data Unit (MAC-PDU) that includes a header (5 bytes), frame body or payload (0-255 bytes), and a frame check sequence (FCS) used in a cycle redundancy check (CRC) process (2 bytes). The different information and size of the elements in the MAC-PDU may vary according to different preferences or configuration of the VLC channel. For example, the header may need only 2 bytes to carry the appropriate information, or the total size of the frame may be limited to approximately 150 bytes because of clock drift (e.g., the clocks on the controller do not stay synchronized long enough to receive data frames that exceed 150 bytes in length).

To transmit the MAC-PDU, the bits of information may be transmitted in the data slots of the receiver LEDs. That is, as the receiver LEDs follow the idle pattern, during each dark slot, the transmitter LED emits either an ON or an OFF signal which, as discussed above, is decoded into either a logical 1 or 0. For example, if 2-PPM bit encoding is used, an ON signal received during the first dark slot is a logical 1 but an ON signal received during the second dark slot is a logical 0. During the energy slots, the transmitter LED may transmit the other half of the encoded data. For example, if the transmitter LED desires to transmit a 1 and a 0, the encoded data is "OFF-ON-ON-OFF". The first OFF signal is transmitted during the first energy slot of the receiver LED, the first ON signal is transmitted during the first dark slot, the second ON is transmitted during the second dark slot, and the second OFF is transmitted during the second energy slot. Accordingly, to transmit two bits of data to a receiver LED, the MAC-PDU includes four slots—two slots which align with energy slots and two slots that align with dark slots of the receiver LED. Thus, the MAC-PDU shown in FIG. 10 may transmit 255 bytes of data to the receiver LED but only half of that data is actually received and decoded by the receiver LEDs. That is, when the receiver LEDs are forward biased, the data being transmitted by the transmitter LED is ignored.

Moreover, FIG. 10 illustrates that a MAC-PDU may be encapsulated in a physical (PHY) PDU data frame that includes the SFD preamble. As discussed above, the SFD preamble includes 16 slots and transmits 1 byte of data (e.g., 00110011) which is received at the receiver LEDs during the data slots shown in FIG. 8B. Additionally, the time shown in FIG. 10 varies as the number of bytes in the frame body changes. For example, assuming that each slot is 500 microseconds in length, if the length of the MAC-PDU is 7 bytes (56 bits/112 slots) than the total length of the PHY-PDU is 128 slots and is transmitted in 64 milliseconds. As discussed previously, half of the 128 slots may be transmitted during the energy slots of the receiver LEDs and therefore are ignored, while the other half are transmitted during the dark slots and are decoded by the receiver LEDs into data bits.

Returning to FIG. 9, at block 920, the transmitter LED switches to receiver mode and waits to see if an ACK frame is received from the receiver LEDs. In one embodiment, the ACK frame may have the same structure as the MAC-PDU shown in FIG. 10 except that the data frame does not include any payload data. A transmitter LED may not receive an ACK frame back for any number of reasons, for example, there may not be any receiver LEDs in range, another LED may have begun transmitting a data frame during the same contention window (i.e., a conflict), data may have been corrupted, and the like. If the transmitter LED does not receive an ACK frame (e.g., the controller times out), method 900 returns to step 905 to again generate a random timer value and attempt to retransmit the data frame.

If an ACK frame is received, at block 925, the transmitter LED may switch from transmitter mode to idle mode and again transmit the idle pattern to resynchronize the clocks associated with the LEDs. For example, even if the LEDs use the same type of controllers, manufacturing variance may cause the clocks to drift relative to each other. That is, even if the clocks are synched once the data frame is transmitted, after the data frame is transmitted and the ACK frame is received, the clocks may have drifted. As such, in one embodiment, the LEDs may return to the idle pattern for at least one or two contention windows to allow the clocks to resynchronize before another LED attempts to transmit a new data frame in the VLC channel. Stated differently, even if the same transmitter LED wants to send multiple MAC-PDU data frames, before sending subsequent frames, the timer value may be set such that the transmitter LED waits at least one contention window before again transmitting a new data frame.

Conclusion

A VLC system may use semiconductor light sources (e.g., LEDs) coupled to a controller to both transmit and receive data messages. When a LED transmits data, the associated controller provides a forward bias. Additionally, the VLC system may use the LED as a receiver if a reverse bias is applied. In this manner, a single LED may be used for bi-directional communication in a wireless system.

In one embodiment, before transmitting data frames in an ad hoc VLC environment, the LEDs may synchronize. To do so, the LEDs may transmit an idle pattern that includes a plurality of dark slots (i.e., when the LED is reversed biased) and energy slots (i.e., when the LED is forward biased). During the dark slots, a controller coupled to the LED may determine the amount of light striking the LED. For example, the idle pattern may include two consecutive dark slots during which the controller may measure the light in each dark slot and adjust the clock accordingly. Each LED in the VLC system may transmit the idle pattern and use the dark slots to adjust their clocks. Because each LED is synchronizing during the dark slots, the VLC system is able to synchronize faster than a VLC system where only one LED adjusts its clock based on the light emitted from another LED. Eventually, the LEDs are synched and a data frame may be transmitted between the LEDs.

Before transmitting a data frame, a light source may transmit a start frame delimiter (SFD). The SFD may be a pre-defined pattern recognizable by the controllers coupled to the light sources. The VLC systems may, while transmitting the idle pattern, record data in sliding windows. For example, the controllers coupled to the light source may store the data detected during the last eight dark slots. If the recorded data matches the predefined SFD pattern, then the controller determines that a light source is about to transmit a data packet, and in response, switches the light source from idle mode to receiver mode. Once the frame is received, the VLC system that received the data frame may then transmit an acknowledgement frame back to the transmitting VLC system. In one embodiment, both the transmitting and receiving VLC systems may return to idle mode and again resynchronize their clocks. In this manner, two or more light sources in a VLC communication channel may synchronize and transmit data in an ad hoc communication environment.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method, comprising:
    detecting, using a first visible light system, an amount of light received during first and second dark slots of a predefined synchronization pattern;
    comparing the amount of light received during the first dark slot to the amount of light received during the second dark slot;
    adjusting, based on the comparison, a clock in the first visible light system such that the first and second dark slots align with corresponding dark slots of a second visible light system, wherein the first and second visible light systems use the same synchronization pattern;
    emitting light from a light source of the first visible light system during an energy slot in the predefined synchronization pattern,
    wherein respective time periods of the first and second dark slots and energy slot are set to mitigate an ability of a human eye to detect a change from one of the first and second dark slots to the energy slot in the predefined synchronization pattern; and
    after adjusting the clock of the first visible light system, transmitting a predefined start frame delimiter (SFD) preamble, wherein the SFD preamble is configured to maintain the synchronization between the first and second visible light systems,
    wherein the second visible light system is configured to record the data received during the corresponding dark slots in a data window and evaluate the data window to determine if the first visible light system is transmitting the SFD preamble.

2. The method of claim 1, wherein the two dark slots are consecutive slots in the predefined synchronization pattern, and wherein the second visible light system is configured to adjust a respective clock at the same time the clock in first visible light system is adjusted such that the corresponding dark slots align with the first and second dark slots.

3. The method of claim 2, wherein the first dark slot occurs before the second dark slot, and wherein adjusting the clock in the first visible light system further comprises:
if the light detected during the first dark slot is greater than the light detected in the second dark slot, shifting the clock forward in time; and
if the light detected during the second dark slot is greater than the light detected in the first dark slot, shifting the clock backward in time.

4. The method of claim 1, wherein the light source is a light-emitting diode (LED), and wherein the LED is reversed biased during the first and second dark slots and forward biased during the energy slot.

5. The method of claim 1, further comprising, before comparing the amount of light received during the first dark slot to the amount of light received during the second dark slot, identifying an equalization value based on ambient light,
wherein the equalization value is applied to one of the amount of light measured during the first dark slot or the amount of light measured during the second dark slot to equalize the comparison.

6. The method of claim 1, further comprising, before transmitting a data frame from the first visible light system to the second visible light system:
randomly selecting a value for a timer from a range of values; and
upon determining that the timer has expired, transmitting the data frame.

7. The method of claim 1, further comprising, after adjusting the clock, transmitting a data frame from the first visible light system to the second visible light system, wherein the first visible light system transmits coded data using a predefined code schema that mitigates flicker,
wherein the second visible light system decodes the coded data into logical bits based on the predefined code schema.

8. The method of claim 7, further comprising, after transmitting the data frame:
switching into a receive mode, wherein the first visible light system follows the predefined synchronization pattern;
upon determining that the second visible light system has transmitted an acknowledgement frame, adjusting the clock in the second visible light system; and
upon determining that the second visible light system has not transmitted the acknowledgment frame, retransmitting the data frame.

9. The method of claim 1, wherein time periods of the first dark slot, the second dark slot, and the energy slot are less than or equal to 30 ms.

10. A first visible light system, comprising:
a light source; and
a controller coupled to the light source, the controller configured to:
detect an amount of light received during first and second dark slots of a predefined synchronization pattern,
compare the amount of light received during the first dark slot to the amount of light received during the second dark slot,
synchronize, based on the comparison, a clock in the visible light system such that the first and second dark slots align with corresponding dark slots of a second visible light system, wherein the first and second visible light systems use the same synchronization pattern,
emit light from the light source during an energy slot in the predefined synchronization pattern,
wherein respective time periods of the first and second dark slots and energy slot are set to mitigate an ability of a human eye to detect a change from one of the first and second dark slots to the energy slot in the predefined synchronization pattern, and
after adjusting the clock of the first visible light system, transmit a predefined start frame delimiter (SFD) preamble, wherein the SFD preamble is configured to maintain the synchronization between the first and second visible light systems,
wherein the second visible light system is configured to record the data received during the corresponding dark slots in a data window and evaluate the data window to determine if the first visible light system is transmitting the SFD preamble.

11. The system of claim 10, wherein the light source is a light-emitting diode (LED), and wherein the LED is reversed biased during the first and second dark slots and forward biased during the energy slot.

12. The system of claim 10, wherein the controller is configured to, before transmitting a data frame to the second visible light system using the light source:
randomly select a value for a timer from a range of values; and
upon determining that the timer has expired, transmit the data frame.

13. The system of claim 10, wherein the controller is configured to, after synchronizing the clock, transmit a data frame to the second visible light system using the light source, wherein the controller transmits coded data using a predefined code schema that mitigates flicker,
wherein the second visible light system is configured to decode the coded data into logical bits based on the predefined code schema.

14. The system of claim 13, wherein the controller is configured to, after transmitting the data frame:
switch into a receive mode, wherein the controller follows the predefined synchronization pattern;
upon determining that the second visible light system has transmitted an acknowledgement frame, synchronize the clock in the second visible light system; and
upon determining that the second visible light system has not transmitted the acknowledgment frame, retransmit the data frame.

15. A first visible light system, comprising:
a light source; and
a controller coupled to the light source, the controller configured to:
detect an amount of light received during first and second dark slots of a predefined synchronization pattern,
compare the amount of light received during the first dark slot to the amount of light received during the second dark slot, synchronize, based on the comparison, a clock in the visible light system such that the first and second dark slots align with corresponding dark slots of a second visible light system, wherein the first and second visible light systems use the same synchronization pattern, and emit light from the light source during an energy slot in the predefined synchronization pattern, wherein respective time periods of the first and second dark slots and energy slot are set to mitigate an ability of a human eye to detect a change from one of the first and second dark slots to the energy slot in the predefined synchronization pattern, wherein the two dark slots are consecutive slots in the predefined synchronization pattern, and wherein the second visible light system is configured to adjust a respective clock at the same time the clock in first visible light system is adjusted such that the corresponding dark slots align with the first and second dark slots.

16. The system of claim 15, wherein the first dark slot occurs before the second dark slot, and wherein adjusting the clock in the first visible light system further comprises:

if the light detected during the first dark slot is greater than the light detected in the second dark slot, shifting the clock forward in time; and if the light detected during the second dark slot is greater than the light detected in the first dark slot, shifting the clock backward in time.

17. A first visible light system, comprising:
a light source; and
a controller coupled to the light source, the controller configured to:

detect an amount of light received during the first and second dark slots of a predefined synchronization pattern, compare the amount of light received during the first dark slot to the amount of light received during the second dark slot, before comparing the amount of light received during the first dark slot to the amount of light received during the second dark slot, indentify an equalization value based on the ambient light, wherein the equalization value is applied to one of the amount of light measured during the first dark slot or the amount of light measured during the second dark slot to equalize the comparison, synchronize, based on the comparison, clock in the visible light system such that the first and second dark slots align with corresponding dark slots of a second visible light system, wherein the first and second visible light systems use the same synchronization pattern, and emit light from the light source during the energy slot in the predefined synchronization pattern, wherein respective time periods of the first and second dark slots and energy slot are set to mitigate an ability of a human eye to detect a change from one of the first and second dark slots to the energy slot in the predefined synchronization pattern.

* * * * *

UNITED STATES PATENT AND TRADEMARK OFFICE
CERTIFICATE OF CORRECTION

| | | |
|---|---|---|
| PATENT NO. | : 9,264,138 B2 | Page 1 of 1 |
| APPLICATION NO. | : 13/895400 | |
| DATED | : February 16, 2016 | |
| INVENTOR(S) | : Schmid et al. | |

It is certified that error appears in the above-identified patent and that said Letters Patent is hereby corrected as shown below:

In the Specification:
Column 9, Line 16, insert -- is -- after 1;

In the Claims:
Column 20, Claim 17, Line 5, delete "the";

Column 20, Claim 17, Line 12, delete "indentify" and insert -- identify -- therefor;

Column 20, Claim 17, Line 13, delete "the";

Column 20, Claim 17, Line 18, insert -- a -- before clock;

Column 20, Claim 17, Line 24, delete "the energy" and insert -- an energy -- therefor.

Signed and Sealed this
Nineteenth Day of April, 2016

Michelle K. Lee
*Director of the United States Patent and Trademark Office*